United States Patent
Kim et al.

(10) Patent No.: US 10,023,661 B2
(45) Date of Patent: Jul. 17, 2018

(54) END-FUNCTIONAL CONJUGATED DIENE-BASED POLYMER AND METHOD OF PREPARING SAME

(71) Applicant: LG Chem, Ltd., Seoul (KR)

(72) Inventors: Jin-Young Kim, Daejeon (KR); Ro-Mi Lee, Daejeon (KR); No-Ma Kim, Daejeon (KR)

(73) Assignee: LG Chem, Ltd. (KR)

( * ) Notice: Subject to any disclaimer, the term of this patent is extended or adjusted under 35 U.S.C. 154(b) by 193 days.

(21) Appl. No.: 15/120,312

(22) PCT Filed: Sep. 18, 2015

(86) PCT No.: PCT/KR2015/009844
§ 371 (c)(1),
(2) Date: Aug. 19, 2016

(87) PCT Pub. No.: WO2016/085102
PCT Pub. Date: Jun. 2, 2016

(65) Prior Publication Data
US 2017/0066849 A1    Mar. 9, 2017

(30) Foreign Application Priority Data

Nov. 27, 2014  (KR) .................. 10-2014-0167575
Jul. 23, 2015  (KR) .................. 10-2015-0104488

(51) Int. Cl.
| | | |
|---|---|---|
| C08C 19/25 | (2006.01) | |
| C08C 19/22 | (2006.01) | |
| C08F 236/06 | (2006.01) | |
| C08K 3/04 | (2006.01) | |
| C08K 3/36 | (2006.01) | |
| C08F 236/10 | (2006.01) | |

(52) U.S. Cl.
CPC .............. *C08C 19/25* (2013.01); *C08C 19/22* (2013.01); *C08F 236/06* (2013.01); *C08F 236/10* (2013.01); *C08K 3/04* (2013.01); *C08K 3/36* (2013.01); *C08F 2500/17* (2013.01)

(58) Field of Classification Search
CPC ....... C08C 19/25; C08C 19/22; C08F 236/06; C08F 236/10; C08F 2500/17; C08K 3/04; C08K 3/36

USPC .......................................................... 524/572
See application file for complete search history.

(56) References Cited

U.S. PATENT DOCUMENTS

| | | |
|---|---|---|
| 2008/0033110 A1 | 2/2008 | Suzuki et al. |
| 2009/0239974 A1 | 9/2009 | Mori et al. |
| 2010/0056713 A1 | 3/2010 | Oshima |
| 2010/0179274 A1 | 7/2010 | Jinbo et al. |
| 2011/0146877 A1 | 6/2011 | Tanaka et al. |
| 2011/0319519 A1 | 12/2011 | Sone et al. |
| 2012/0136122 A1 | 5/2012 | Shirai et al. |
| 2012/0277369 A1 | 11/2012 | Yoshida et al. |
| 2014/0221563 A1 | 8/2014 | Morita et al. |
| 2014/0243476 A1 | 8/2014 | Lee et al. |
| 2014/0323660 A1 | 10/2014 | Hirayama |

FOREIGN PATENT DOCUMENTS

| | | | |
|---|---|---|---|
| CN | 101659728 A | | 3/2010 |
| CN | 102026826 A | | 4/2011 |
| CN | 102348748 A | | 2/2012 |
| CN | 102482359 A | | 5/2012 |
| CN | 103958591 A | | 7/2014 |
| EP | 2484701 A1 | | 8/2012 |
| JP | 10280275 A | * | 10/1998 |
| JP | 2011-121906 A | | 6/2011 |
| JP | 2013082826 A | | 5/2013 |
| KR | 20070117626 A | | 12/2007 |
| KR | 20080044880 A | | 5/2008 |
| KR | 20120042958 A | | 5/2012 |
| KR | 20120058564 A | | 6/2012 |
| KR | 20130090811 A | | 8/2013 |
| KR | 20140052985 A | | 5/2014 |
| WO | 2005097845 A1 | | 10/2005 |

OTHER PUBLICATIONS

Database WPI Week 201333 Thomson Scientific, London, GB; AN 2013-G94166 XP002764787.

* cited by examiner

*Primary Examiner* — Kelechi Egwim
(74) *Attorney, Agent, or Firm* — Lerner, David, Littenberg, Krumholz & Mentlik, LLP

(57) ABSTRACT

Disclosed are a modified conjugated diene-based polymer, a method of preparing the same, and a rubber composition including the same.

23 Claims, No Drawings

END-FUNCTIONAL CONJUGATED DIENE-BASED POLYMER AND METHOD OF PREPARING SAME

CROSS-REFERENCE TO RELATED APPLICATION

This application is a national phase entry under 35 U.S.C. § 371 of International Application No. PCT/KR2015/009844, filed Sep. 18, 2015, which claims priority to Korean Patent Application No. 10-2014-0167575, filed Nov. 27, 2014 and Korean Patent Application No. 10-2015-0104488, filed Jul. 23, 2015, the disclosures of which are incorporated herein by reference.

TECHNICAL FIELD

The present invention relates to a modified conjugated diene-based polymer and a method of preparing the same and, more particularly, to an end-functionalized conjugated diene-based polymer and a method of preparing the same, in which the end-functionalized conjugated diene-based polymer may exhibit high processability when mixed with an inorganic filler as a reinforcing agent and is superior in heat build-up, tensile strength, wear resistance, fuel economy, and wet skid resistance.

BACKGROUND ART

In the recent vehicle industry, the demand for durability and fuel economy is continuously increasing, and much effort is being directed to satisfying the demand.

In particular, many attempts have been made to enhance the properties of rubber for vehicle tires, especially tire treads in direct contact with roads. Conventional tire treads have been manufactured by mixing conjugated diene-based rubber with an inorganic filler for enhancing the properties as above, but problems of high hysteresis loss or low dispersibility may occur.

Hence, there is a need to develop rubber having high processability, excellent wet skid resistance and mechanical strength, and low rolling resistance, as a material for tire treads in order to improve performance of vehicle tires.

To this end, research is ongoing into a method of preparing a modified conjugated diene-based polymer, as disclosed in, for example, JP WO2005-097845 A1, but the effects thereof are insufficient.

DISCLOSURE

Technical Problem

An object of the present invention is to provide a modified conjugated diene-based polymer having high processability and superior compatibility with an inorganic filler.

Another object of the present invention is to provide a method of preparing the modified conjugated diene-based polymer.

Still another object of the present invention is to provide a rubber composition, which includes the modified conjugated diene-based polymer and is superior in terms of heat build-up, tensile strength, wear resistance, fuel economy, and wet skid resistance.

Yet another object of the present invention is to provide a tire or tire tread, including the rubber composition.

Technical Solution

In order to accomplish the above objects, an aspect of the present invention provides a modified conjugated diene-based polymer represented by Chemical Formula 1 below:

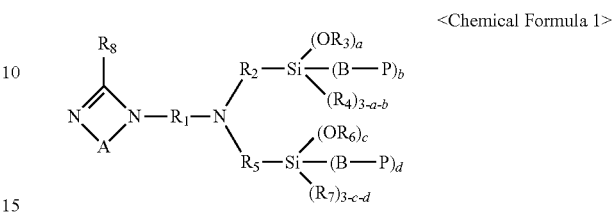

<Chemical Formula 1> in Chemical Formula 1, $R_1$, $R_2$, and $R_5$ are each independently a C1-C10 alkylene group, $R_3$, $R_4$, $R_6$, and $R_7$ are each independently a C1-C10 alkyl group, $R_8$ is hydrogen or a C1-C10 alkyl group, P is a conjugated diene-based polymer chain, B is Chemical Formula 15 below, a and c are each independently 0, 1, or 2, b and d are each independently 1, 2, or 3, a+b and c+d are each independently 1, 2, or 3, and A is

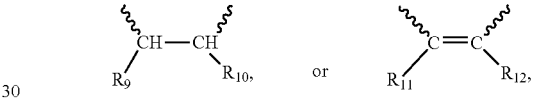

wherein $R_9$, $R_{10}$, $R_{11}$, and $R_{12}$ are each independently hydrogen or a C1-C10 alkyl group, and

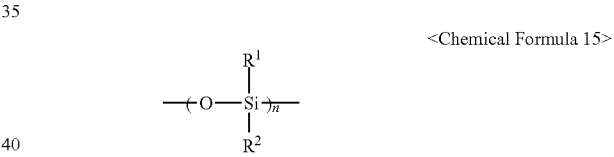

<Chemical Formula 15> in Chemical Formula 15, n is an integer from 3 to 6, and $R^1$ and $R^2$ each are hydrogen, an alkyl group, an aryl group or a cycloalkyl group.

Another aspect of the present invention provides a method of preparing a modified conjugated diene-based polymer, comprising: (a) polymerizing a conjugated diene monomer or a conjugated diene monomer and a vinyl aromatic monomer with an organometallic compound in the presence of a solvent, thus forming an active polymer having a metal end; (b) end-capping the active polymer having an alkali metal end with a compound represented by Chemical Formula 13 below; and (c) modifying the active polymer with a compound represented by Chemical Formula 8 below:

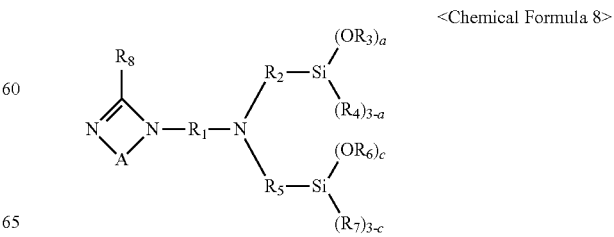

<Chemical Formula 8> in Chemical Formula 8, $R_1$, $R_2$, and $R_5$ are each independently a C1-C10 alkylene group, $R_3$, $R_4$, $R_6$, and $R_7$ are each independently a C1-C10 alkyl group, $R_8$ is hydrogen or a C1-C10 alkyl group, a and c are each independently 0, 1, 2, or 3, and A is

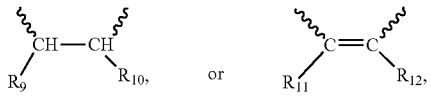

wherein $R_9$, $R_{10}$, $R_{11}$, and $R_{12}$ are each independently hydrogen or a C1-C10 alkyl group, and <Chemical Formula 13>

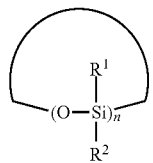

in Chemical Formula 13, n is an integer from 3 to 6, and $R^1$ and $R^2$ each are hydrogen, an alkyl group, an aryl group or a cycloalkyl group.

Still another aspect of the present invention provides a modified conjugated diene-based polymer rubber composition, comprising 100 parts by weight of the modified conjugated diene-based polymer and 0.1 to 200 parts by weight of an inorganic filler.

Yet another aspect of the present invention provides a tire using the modified conjugated diene-based polymer rubber composition.

Advantageous Effects

According to an embodiment of the present invention, a modified conjugated diene-based polymer having high processability and superior compatibility with an inorganic filler can be provided. Also, a rubber composition including the modified conjugated diene-based polymer can be utilized to manufacture a tire having excellent heat build-up, tensile strength, wear resistance, fuel economy and wet skid resistance, and low rolling resistance.

BEST MODE

The present invention addresses a modified conjugated diene-based polymer, a method of preparing the polymer, a rubber composition including the polymer, and a tire using the rubber composition. According to the present invention, the conjugated diene-based polymer, and the rubber composition or the tire using the same can exhibit superior processability, stability, and wear resistance.

Hereinafter, a detailed description will be given of the present invention.

According to an aspect of the present invention, a modified conjugated diene-based polymer is represented by Chemical Formula 1 below:

<Chemical Formula 1>

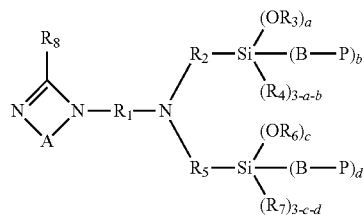

in Chemical Formula 1, $R_1$, $R_2$, and $R_5$ may be each independently a C1-C10 alkylene group, $R_3$, $R_4$, $R_6$, and $R_7$ may be each independently a C1-C10 alkyl group, $R_8$ may be hydrogen or a C1-C10 alkyl group, P may be a conjugated diene-based polymer chain, B may be Chemical Formula 15 below, a and c may be each independently 0, 1, or 2, b and d may be each independently 1, 2, or 3, a+b and c+d may be each independently 1, 2, or 3, and A may be

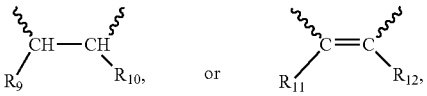

wherein $R_9$, $R_{10}$, $R_{11}$, and $R_{12}$ may be each independently hydrogen or a C1-C10 alkyl group, but the present invention is not limited thereto, and <Chemical Formula 15>

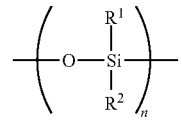

in Chemical Formula 15, n is an integer from 3 to 6, and $R^1$ and $R^2$ each may be hydrogen, an alkyl group, an aryl group or a cycloalkyl group.

The modified conjugated diene-based polymer has a number average molecular weight (Mn) of 1,000 to 2,000,000 g/mol, preferably 10,000 to 1,000,000 g/mol, and more preferably 100,000 to 1,000,000 g/mol. When the number average molecular weight of the modified conjugated diene-based polymer falls in the above range, a modification reaction may efficiently occur, and desired properties may be obtained.

The modified conjugated diene-based polymer has a polydispersity index (Mw/Mn) of 0.5 to 10, preferably 0.5 to 5, and more preferably 1 to 5. When the polydispersity index of the modified conjugated diene-based polymer falls in the above range, mixing with inorganic particles may be efficiently carried out, thus improving properties and remarkably increasing processability.

The modified conjugated diene-based polymer has a vinyl content of 5 wt % or more, and preferably 8 to 70 wt %.

As such, the vinyl content refers to the amount of a monomer having a vinyl group, or the amount of not 1,4-but 1,2-added conjugated diene monomer based on 100 wt % of the conjugated diene monomer.

When the vinyl content of the modified conjugated diene-based polymer falls in the above range, the glass transition temperature of the polymer may be elevated. Thus, when such a polymer is applied to tires, the properties required of tires, such as running resistance and braking force, may be satisfied, and fuel economy may be improved.

The conjugated diene-based polymer chain represented as P in Chemical Formula 1 may be derived from a homopolymer of a conjugated diene monomer or a copolymer of a conjugated diene monomer and a vinyl aromatic monomer.

Specifically, the conjugated diene-based polymer chain may be formed as follows: a conjugated diene monomer or a conjugated diene monomer and a vinyl aromatic monomer may be polymerized in a batch manner or a continuous manner using a hydrocarbon solvent in the presence of an organo-alkali metal compound, thus obtaining a homopolymer or a copolymer having an alkali metal end, which is then reacted with a silyl group substituted with at least one alkoxy group.

As such, the conjugated diene-based polymer chain may be a polymer chain comprising 0.0001 to 50 parts by weight, 10 to 40 parts by weight, or 15 to 40 parts by weight of the aromatic vinyl monomer, based on 100 parts by weight in total of the conjugated diene monomer and the vinyl aromatic monomer.

The polymer chain comprising the conjugated diene monomer and the vinyl aromatic monomer may be, for example, a random polymer chain.

The conjugated diene monomer may include at least one selected from the group consisting of 1,3-butadiene, 2,3-dimethyl-1,3-butadiene, piperylene, 3-butyl-1,3-octadiene, isoprene, and 2-phenyl-1,3-butadiene.

The vinyl aromatic monomer may include at least selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene. Particularly useful is styrene or α-methylstyrene.

The modified conjugated diene-based polymer has a Mooney viscosity of 40 or more, preferably from 40 to 100, and more preferably from 45 to 90. Given the above Mooney viscosity range, a modified conjugated diene-based polymer having excellent processability, compatibility, heat build-up, tensile strength, wear resistance, fuel economy, and wet skid resistance may be prepared.

In an embodiment of the present invention, the modified conjugated diene-based polymer may be represented by Chemical Formula 2 or Chemical Formula 3 below:

<Chemical Formula 2>

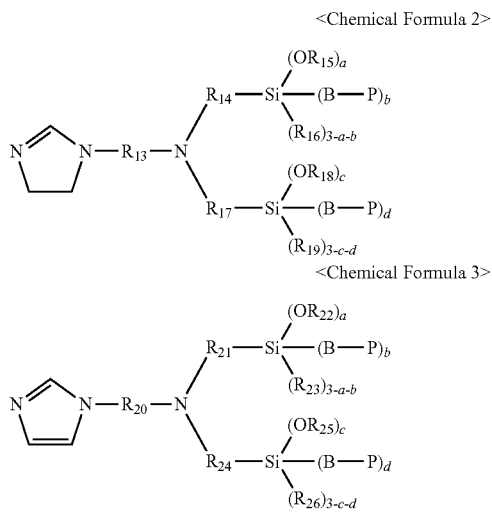

<Chemical Formula 3> in Chemical Formulas 2 and 3, $R_{15}$, $R_{16}$, $R_{18}$, $R_{19}$, $R_{22}$, $R_{23}$, $R_{25}$, and $R_{26}$ may be each independently a C1-C5 alkyl group, $R_{13}$, $R_{14}$, $R_{17}$, $R_{20}$, $R_{21}$, and $R_{24}$ may be each independently a C1-C5 alkylene group, P may be a conjugated diene-based polymer chain, B may be Chemical Formula 15 below, a and c may be each independently 0, 1, or 2, b and d may be each independently 1, 2, or 3, and a+b and c+d may be each independently 1, 2, or 3:

<Chemical Formula 15>

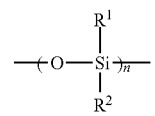

in Chemical Formula 15, n is an integer from 3 to 6, and $R^1$ and $R^2$ each may be hydrogen, an alkyl group, an aryl group or a cycloalkyl group.

Also, the modified conjugated diene-based polymer may be represented by Chemical Formula 4 or Chemical Formula 5 below:

<Chemical Formula 4>

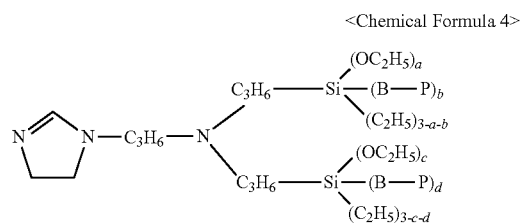

<Chemical Formula 5>

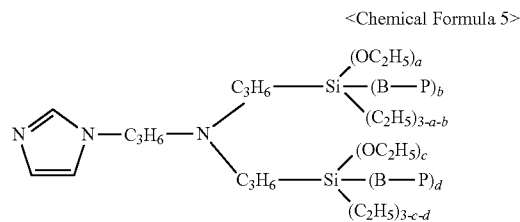

in Chemical Formulas 4 and 5, P may be a conjugated diene-based polymer chain, B may be Chemical Formula 15 below, a and c may be each independently 0, 1, or 2, b and d may be each independently 1, 2, or 3, and a+b and c+d may be each independently 1, 2, or 3:

<Chemical Formula 15>

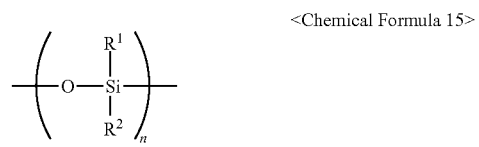

in Chemical Formula 15, n is an integer from 3 to 6, and $R^1$ and $R^2$ each may be hydrogen, an alkyl group, an aryl group or a cycloalkyl group.

Specifically, the modified conjugated diene-based polymer may be represented by Chemical Formula 6 or Chemical Formula 7 below:

<Chemical Formula 6>

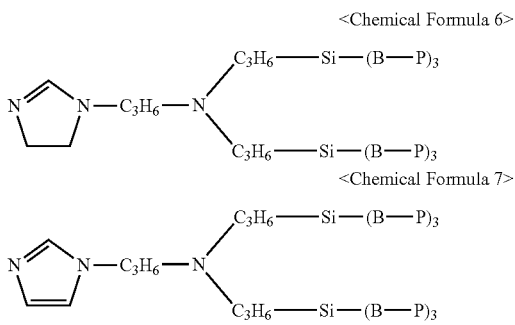

<Chemical Formula 7> in Chemical Formulas 6 and 7, P may be a conjugated diene-based polymer chain, and B may be Chemical Formula 15 below:

<Chemical Formula 15>

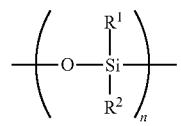

in Chemical Formula 15, n is an integer from 3 to 6, and $R^1$ and $R^2$ each may be hydrogen, an alkyl group, an aryl group or a cycloalkyl group.

The compound of Chemical Formula 15 preferably includes, but is not limited to, a compound represented by Chemical Formula 16 below.

<Chemical Formula 16>

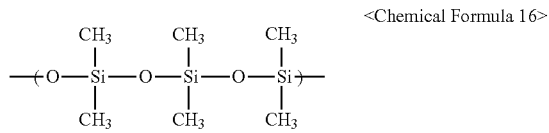

Another aspect of the present invention addresses a method of preparing a modified conjugated diene-based polymer, comprising: (a) polymerizing a conjugated diene monomer or a conjugated diene monomer and a vinyl aromatic monomer with an organometallic compound in the presence of a solvent, thus forming an active polymer having a metal end; (b) end-capping the active polymer having an alkali metal end with an end-capping agent represented by Chemical Formula 13 below; and (c) modifying the active polymer with a compound represented by Chemical Formula 8 below:

<Chemical Formula 8>

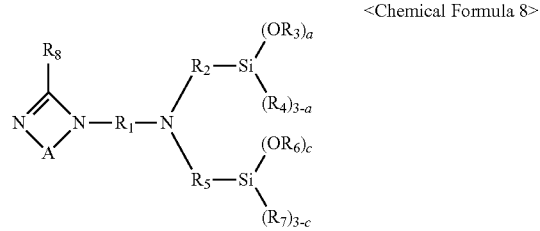

in Chemical Formula 8, $R_1$, $R_2$, and $R_5$ may be each independently a C1-C10 alkylene group, $R_3$, $R_4$, $R_6$, and $R_7$ may be each independently a C1-C10 alkyl group, $R_8$ may be hydrogen or a C1-C10 alkyl group, a and c may be each independently 0, 1, 2, or 3, and A is

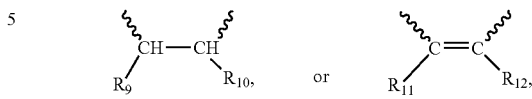

wherein $R_9$, $R_{10}$, $R_{11}$, and $R_{12}$ may be each independently hydrogen or a C1-C10 alkyl group, and <Chemical Formula 13>

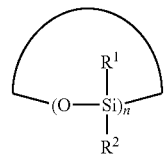

in Chemical Formula 13, n is an integer from 3 to 6, and $R^1$ and $R^2$ each may be hydrogen, an alkyl group, an aryl group or a cycloalkyl group.

The conjugated diene monomer and the vinyl aromatic monomer are described as above.

The solvent is not particularly limited, so long as it may be applied in the polymerization or copolymerization of the conjugated diene monomer, and may be exemplified by a hydrocarbon, or may include at least one selected from the group consisting of n-pentane, n-hexane, n-heptane, isooctane, cyclohexane, toluene, benzene, and xylene.

The organometallic compound may be an organo-alkali metal compound, or may include at least one selected from the group consisting of an organolithium compound, an organosodium compound, an organopotassium compound, an organorubidium compound, and an organocesium compound.

For example, the organometallic compound may include at least one selected from the group consisting of methyllithium, ethyllithium, isopropyllithium, n-butyllithium, sec-butyllithium, tert-butyllithium, n-decyllithium, tert-octyllithium, phenyllithium, 1-naphthyllithium, n-eicosyllithium, 4-butylphenyllithium, 4-tolyllithium, cyclohexyllithium, 3,5-di-n-heptylcyclohexyllithium, and 4-cyclopentyllithium. Preferably as the organometallic compound is n-butyllithium, sec-butyllithium or a mixture thereof.

Alternatively, the organometallic compound may include at least one selected from the group consisting of naphthyl sodium, naphthyl potassium, lithium alkoxide, sodium alkoxide, potassium alkoxide, lithium sulfonate, sodium sulfonate, potassium sulfonate, lithium amide, sodium amide, and potassium amide, and may be used in combination with another organometallic compound.

In an embodiment of the present invention, the organometallic compound may be used in an amount of 0.01 to 10 mmol, 0.05 to 5 mmol, 0.1 to 2 mmol, or 0.1 to 1 mmol, based on 100 g in total of the monomer. When the amount of the organometallic compound falls in the above range, a conjugated diene-based polymer optimal for use in preparation of a modified conjugated diene-based polymer may be obtained.

The molar ratio of the organometallic compound and the compound represented by Chemical Formula 8 may be, for example, 1:0.1 to 1:10, and is preferably 1:0.3 to 1:2. When the molar ratio thereof falls in the above range, the conjugated diene-based polymer may be subjected to a modification reaction to ensure optimal performance.

As used herein, the active polymer having a metal end refers to a polymer comprising a polymer anion and a metal cation, which are coupled with each other.

In the method of preparing the modified conjugated diene-based polymer according to an embodiment of the present invention, the polymerizing in (a) may be performed with the additional use of a polar additive. The reason why the polar additive is further added is that the reaction rates of the conjugated diene monomer and the vinyl aromatic monomer are controlled by the polar additive.

The polar additive may be a base, or may include ether, amine or mixtures thereof. Specifically, it may be selected from the group consisting of tetrahydrofuran, ditetrahydrofurylpropane, diethylether, cycloamylether, dipropylether, ethylenedimethylether, ethylenedimethylether, diethyleneglycol, dimethylether, tert-butoxyethoxyethane bis(2-dimethylaminoethyl)ether, (dimethylaminoethyl)ethylether, trimethylamine, triethylamine, tripropylamine, and tetramethylethylenediamine, and is preferably ditetrahydropropylpropane, triethylamine, or tetramethylethylenediamine.

The polar additive may be used in an amount of 0.001 to 50 g, 0.001 to 10 g, 0.005 to 1 g, or 0.005 to 0.2 g, based on 100 g in total of the added monomer.

The polar additive may be used in an amount of 0.001 to 10 g, 0.005 to 1 g, or 0.005 to 0.2 g, based on 1 mmol in total of the added organometallic compound.

When the conjugated diene monomer and the vinyl aromatic monomer are copolymerized, it is easy to prepare a block copolymer due to the difference in the reaction rates therebetween. However, when the polar additive is added, the low reaction rate of the vinyl aromatic monomer may be increased to thus induce the microstructure of the corresponding copolymer, for example, a random copolymer.

In (a), the polymerizing may be exemplified by anionic polymerization. Specifically, the polymerizing in (a) may be living anionic polymerization for forming an active end through a growth reaction by anions.

Also, the polymerizing in (a) may be high-temperature polymerization or room-temperature polymerization.

High-temperature polymerization is a polymerization process including adding an organometallic compound and then applying heat to increase the reaction temperature, and room-temperature polymerization is a polymerization process that takes place in such a way that heat is not applied after the addition of an organometallic compound.

The polymerizing in (a) may take place at a temperature ranging from −20 to 200° C., 0 to 150° C., or 10 to 120° C.

The end-capping using the end-capping agent in (b) may be carried out by adding a compound of Chemical Formula 13 below:

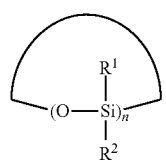

<Chemical Formula 13> in Chemical Formula 13, n is an integer from 3 to 6, and $R^1$ and $R^2$ each may be hydrogen, an alkyl group, an aryl group or a cycloalkyl group.

Also, (b) may be conducted at 0 to 90° C. for 1 min to 5 hr.

In (c), at least one, or two or three, selected from among compounds represented by Chemical Formula 8, may be added.

Also, (c) may be performed at 0 to 90° C. for 1 min to 5 hr.

In an embodiment of the present invention, the method of preparing the modified conjugated diene-based polymer may be carried out in a batch manner, or alternatively in a continuous manner using at least one reactor.

The compound of Chemical Formula 8 may be represented by, for example, Chemical Formula 9 or Chemical Formula 10 below:

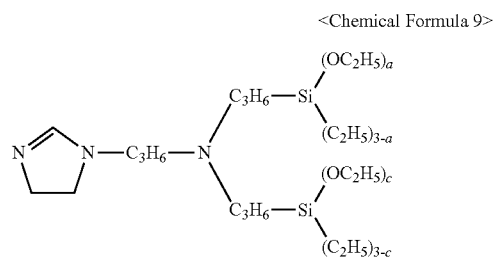

<Chemical Formula 9>

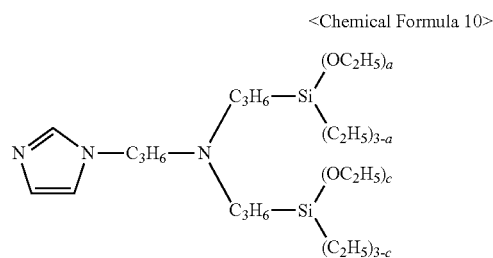

<Chemical Formula 10> in Chemical Formulas 9 and 10, a and c may be each independently an integer of 0, 1, 2, or 3.

Also, the compound of Chemical Formula 8 may be represented by Chemical Formula 11 or Chemical Formula 12 below.

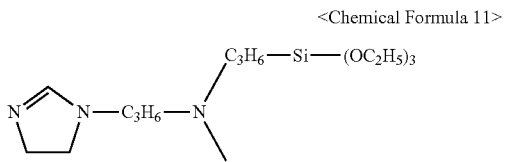

<Chemical Formula 11>

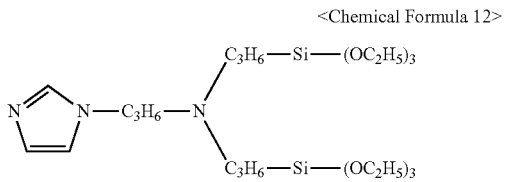

<Chemical Formula 12>

Also, the end-capping agent of Chemical Formula 13 may be a compound represented by Chemical Formula 14 below.

<Chemical Formula 14>

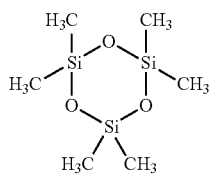

According to the present invention, the modified conjugated diene-based polymer may exhibit viscoelastic properties. When measured at 10 Hz using DMA after mixing with silica, Tan δ at 0° C. may be in the range of 0.4 to 1, or 0.5 to 1. Given the above Tan δ range, desired skid resistance or wet resistance may be obtained.

Also, Tan δ at 60° C. may be in the range of 0.3 to 0.2, or 0.15 to 0.1. Given the above Tan δ range, desired rolling resistance or rotational resistance (RR) may be obtained.

Still another aspect of the present invention addresses a modified conjugated diene-based polymer rubber composition, comprising 100 parts by weight of the modified conjugated diene-based polymer and 0.1 to 200 parts by weight of an inorganic filler.

The amount of the inorganic filler may be 10 to 150 parts by weight, or 50 to 100 parts by weight.

The inorganic filler may include at least one selected from the group consisting of a silica-based filler, carbon black, and mixtures thereof. When the inorganic filler is a silica-based filler, dispersibility is significantly increased and the end of the modified conjugated diene-based polymer of the invention may be coupled with silica particles, thus significantly decreasing hysteresis loss.

The modified conjugated diene-based polymer rubber composition may further comprise an additional conjugated diene-based polymer.

The additional conjugated diene-based polymer may include SBR (styrene-butadiene rubber), BR (butadiene rubber), natural rubber, or mixtures thereof. SBR may be exemplified by SSBR (solution styrene-butadiene rubber).

When the additional conjugated diene-based polymer is further added, the modified conjugated diene-based polymer rubber composition may comprise 20 to 100 parts by weight of the modified conjugated diene-based polymer and 0 to 80 parts by weight of the additional conjugated diene-based polymer.

Alternatively, the modified conjugated diene-based polymer rubber composition according to the present invention may comprise 20 to 99 parts by weight of the modified conjugated diene-based polymer and 1 to 80 parts by weight of the additional conjugated diene-based polymer.

Alternatively, the modified conjugated diene-based polymer rubber composition according to the present invention may comprise 10 to 100 parts by weight of the modified conjugated diene-based polymer, 0 to 90 parts by weight of the additional conjugated diene-based polymer, 0 to 100 parts by weight of carbon black, 5 to 200 parts by weight of silica, and 2 to 20 parts by weight of a silane coupling agent.

Alternatively, the modified conjugated diene-based polymer rubber composition according to the present invention may comprise 10 to 100 parts by weight of the modified conjugated diene-based polymer, 0 to 90 parts by weight of the additional conjugated diene-based polymer, 0 to 100 parts by weight of carbon black, 5 to 200 parts by weight of silica, and 2 to 20 parts by weight of a silane coupling agent, in which the total weight of the modified conjugated diene-based polymer and the additional conjugated diene-based polymer may be 100 parts by weight.

Alternatively, the modified conjugated diene-based polymer rubber composition according to the present invention may comprise 100 parts by weight of a polymer mixture comprising 10 to 99 wt % of the modified conjugated diene-based polymer and 1 to 90 wt % of the additional conjugated diene-based polymer, 1 to 100 parts by weight of carbon black, 5 to 200 parts by weight of silica, and 2 to 20 parts by weight of a silane coupling agent.

In addition, the modified conjugated diene-based polymer rubber composition may further comprise 1 to 100 parts by weight of oil. The oil may be exemplified by mineral oil or a softener.

The oil may be used in an amount of, for example, 10 to 100 parts by weight, or 20 to 80 parts by weight, based on 100 parts by weight of the conjugated diene-based copolymer. Given the above oil amount range, desired properties may be exhibited, and the rubber composition is appropriately softened, thus increasing processability.

Yet another aspect of the present invention addresses a tire or tire tread using the modified conjugated diene-based polymer rubber composition as above.

The tire or tire tread is manufactured using the rubber composition comprising the modified conjugated diene-based polymer, which has high processability and superior compatibility with the inorganic filler, and thereby can manifest excellent tensile strength, wear resistance, and wet skid resistance, and low rolling resistance.

MODE FOR INVENTION

A better understanding of the present invention may be obtained via the unlimited examples. Prior thereto, the terms or words used in the description and the claims of the present invention are not construed limitedly as typical or dictionary meanings and should be interpreted as the meanings and concepts of the invention in keeping with the scope of the invention based on the principle that the inventors can appropriately define the terms in order to describe the invention in the best way.

Therefore, the following examples are merely set forth to illustrate but are not to be construed as limiting the present invention, and those skilled in the art will appreciate that diverse variations or substitutions are possible, without departing from the spirit of the present invention. Accordingly, such variations or substitutions fall within the scope of the present invention as defined in the accompanying claims.

EXAMPLES

Example 1

270 g of styrene, 710 g of 1,3-butadiene, 5000 g of n-hexane, and 1.08 g of 2,2-bis(2-oxolanyl)propane as a polar additive were placed in a 20 L autoclave reactor, and then the temperature inside the reactor was raised to 40° C. When the temperature inside the reactor reached 40° C., 4 mmol of n-butyllithium was placed in the reactor, followed by an adiabatic heating reaction.

After about 25 min, 1.19 mmol of hexamethylcyclotrisiloxane was added, and an end-capping reaction was carried out for 15 min.

Thereafter, 2.73 mmol of N,N-bis(triethoxysilylpropyl)aminopropyl-1-imidazole was added, and the reaction was carried out for 15 min. Then, the polymerization reaction was stopped using ethanol, and 45 mL of a solution of 0.3 wt % BHT (butylated hydroxytoluene) antioxidant in hexane was added. The resulting polymer was placed in water warmed with steam and stirred to remove the solvent, followed by roll drying to remove the remaining solvent and water, yielding a modified conjugated diene-based polymer. The results of analysis of the modified conjugated diene-based polymer thus obtained are shown in Table 1 below.

Example 2

A polymer was prepared in the same manner as in Example 1, with the exception that the end-capping reaction was carried out using 2.73 mmol of hexamethylcyclotrisiloxane.

Comparative Example 1

A commercially available non-modified conjugated diene-based polymer (5025-2HM grade, made by LANXESS Deutschland GmbH) was used.

Comparative Example 2

A polymer was prepared in the same manner as in Example 1, with the exception that the end-capping agent was not used.

The conjugated diene-based polymers prepared in Examples 1 and 2 and Comparative Examples 1 and 2 were analyzed through the following methods.

a) Mooney viscosity: Two samples having a weight of 15 g or more were preheated for 1 min and then measured at 100° C. for 4 min using an MV-2000, made by ALPHA Technologies.

b) Styrene monomer (SM) and Vinyl content: Measurement was conducted using NMR.

c) Molecular weight (Mp) at peak, Weight average molecular weight (Mw), Number average molecular weight (Mn), and Polydispersity Index (PDI): Measurement was conducted via GPC at 40° C. For this, a column was composed of a combination of two PLgel Olexis columns and one PLgel mixed-C column, made by Polymer Laboratories, and all newly replaced columns were mixed bed type columns. Also, polystyrene (PS) was a GPC standard material for the calculation of molecular weight.

TABLE 1

|  |  | Ex. 1 | Ex. 2 | C. Ex. 1 | C. Ex. 2 |
|---|---|---|---|---|---|
| Sample |  | A | A | B | A |
| n-Butyllithium (mmol) |  | 4 | 4 | — | 4 |
| Polar additive (g) |  | 1.08 | 1.08 | — | 1.08 |
| End-capping agent (mmol) | a | 1.19 | 2.73 | — | — |
|  | b | — | — | — | — |
| Modifier (mmol) | c | 2.73 | 2.73 | — | 2.73 |
| Mooney viscosity (MV) |  | 85 | 78 | 61 | 88 |
| NMR | Styrene | 27 | 27 | 26 | 27 |
|  | Vinyl | 43 | 13 | 50 | 43 |
| GPC (×10⁴) | Mp | 25 | 25 | — | 25 |
|  | Mn | 41 | 41 | 39 | 38 |
|  | Mw | 60 | 53 | 69 | 55 |
|  | PDI | 1.5 | 1.3 | 1.8 | 1.4 |

A: styrene 270 g, 1,3-butadiene 710 g, and n-hexane 5,000 g
B: 5025-2HM grade, made by LANXESS Deutschland GmbH, TDAE oil 37.5 phr
a: hexamethylcyclotrisiloxane
b: octamethyltrisiloxane
c: N,N-bis(triethoxysilylpropyl)aminopropyl-1-imidazole Preparation Examples The conjugated diene-based polymer rubber compositions were prepared using, as raw rubber, samples A and B shown in Table 1, under the mixing conditions of Table 2 below. The unit of material in Table 2 is phr, based on 100 parts by weight of rubber.

Specifically, the conjugated diene-based polymer rubber composition was kneaded through primary kneading and secondary kneading. Upon primary kneading, raw rubber (conjugated diene-based polymer), a filler, an organosilane coupling agent, oil, zinc oxide, a stearic acid antioxidant, an anti-aging agent, wax and an accelerator were kneaded using a Banbury mixer provided with a temperature controller. For this, the temperature of the kneader was controlled, and a first mixture was obtained at a discharge temperature of 145 to 155° C. Upon secondary kneading, the first mixture was cooled to room temperature, after which rubber, sulfur and a vulcanization accelerator were placed in the kneader, followed by mixing at 100° C. or less, thus obtaining a second mixture.

Finally, curing was performed at 100° C. for 20 min, yielding the conjugated diene-based polymer rubber compositions of Preparation Examples 1 and 2 using, as raw rubber, the polymers of Examples 1 and 2, and of Comparative Preparation Examples 1 and 2 using the polymers of Comparative Examples 1 and 2 as raw rubber.

TABLE 2

|  | Material | Amount (unit: phr) |
|---|---|---|
| Primary kneading | Rubber | 137.5 |
|  | Silica | 70.0 |
|  | Coupling agent | 11.2 |
|  | Oil | — |
|  | Zinc oxide | 3.0 |
|  | Stearic acid | 2.0 |
|  | Antioxidant | 2.0 |
|  | Anti-aging agent | 2.0 |
|  | Wax | 1.0 |
| Secondary kneading | Rubber accelerator | 1.75 |
|  | Sulfur | 1.5 |
|  | Vulcanization accelerator | 2.0 |
|  | Total weight | 234.0 |

Test Example

The properties of the prepared rubber compositions were measured through the following methods.

1) Tensile Testing

According to a tensile testing method of ASTM 412, the tensile strength upon cutting a test sample and tensile stress (300% modulus) at 300% elongation were measured. For this, a Universal Test Machine 4204 made by Instron was used, and the tensile strength, modulus, and elongation were measured at a tensile speed of 50 cm/min at room temperature.

2) Viscoelasticity

A dynamic mechanical analyzer made by TA was used. When undergoing deformation under conditions of a frequency of 10 Hz in a distortion mode and a measurement temperature (ranging from −60 to 60° C.), the Tan δ of each sample was measured. The Payne effect was represented by the difference between the minimum and the maximum in the deformation range of 0.28 to 40%. The lower the Payne effect, the higher the dispersibility of the filler such as silica. When Tan δ at 0° C. that is a low temperature was increased, wet skid resistance became superior, and when Tan δ at 60° C. that is a high temperature was decreased, hysteresis loss was reduced, and low rolling resistance of tires, namely, increased fuel economy, resulted. Table 3 below shows the properties of the vulcanized rubber.

TABLE 3

| Sample | Prep. Ex. 1 | Prep. Ex. 2 | C. Prep. Ex. 1 | C. Prep. Ex. 2 |
|---|---|---|---|---|
| 300% Modulus (Kgf/cm$^2$) | 128 | 123 | 98 | 115 |
| Tensile strength (Kgf/cm$^2$) | 171 | 166 | 167 | 162 |
| Tanδ at 0° C. (Index) | 104 | 102 | 83 | 100 |
| Tanδ at 60° C. (Index) | 108 | 105 | 89 | 100 |

As is apparent from the results of Table 3, the modified conjugated diene-based polymer rubber compositions of Preparation Examples 1 and 2 according to the present invention had higher Tan δ (improved Index) at 0° C. than that of Comparative Preparation Examples 1 and 2, thereby exhibiting increased wet skid resistance (wet traction), and also showed low Tan δ (improved Index) at 60° C., thus obtaining desired rolling resistance (RR), whereby superior fuel efficiency resulted.

Also, the modified conjugated diene-based polymer rubber compositions of Preparation Examples 1 and 2 according to the present invention were increased in 300% modulus and tensile strength, compared to Comparative Preparation Examples 1 and 2.

INDUSTRIAL APPLICABILITY

According to the present invention, a modified conjugated diene-based polymer, having high processability and superior compatibility with an inorganic filler, can be provided. When using a rubber composition including the modified conjugated diene-based polymer, the resulting tire can exhibit superior heat build-up, tensile strength, wear resistance, fuel economy and wet skid resistance, and low rolling resistance.

The invention claimed is:

1. A modified conjugated diene-based polymer represented by Chemical Formula 1 below:

<Chemical Formula 1>

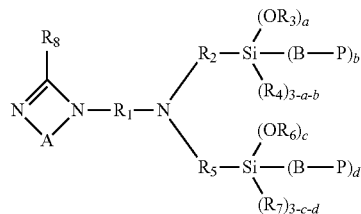

in Chemical Formula 1, $R_1$, $R_2$, and $R_5$ are each independently a C1-C10 alkylene group, $R_3$, $R_4$, $R_6$, and $R_7$ are each independently a C1-C10 alkyl group, $R_8$ is hydrogen or a C1-C10 alkyl group, P is a conjugated diene-based polymer chain, B is Chemical Formula 15 below, a and c are each independently 0, 1, or 2, b and d are each independently 1, 2, or 3, a+b and c+d are each independently 1, 2, or 3, and A is

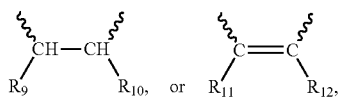

wherein $R_9$, $R_{10}$, $R_{11}$, and $R_{12}$ are each independently hydrogen or a C1-C10 alkyl group, and <Chemical Formula 15>

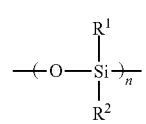

in Chemical Formula 15, n is an integer from 3 to 6, and $R^1$ and $R^2$ each are hydrogen, an alkyl group, an aryl group or a cycloalkyl group.

2. The modified conjugated diene-based polymer of claim 1, wherein Chemical Formula 1 is represented by Chemical Formula 2 or Chemical Formula 3 below:

<Chemical Formula 2>

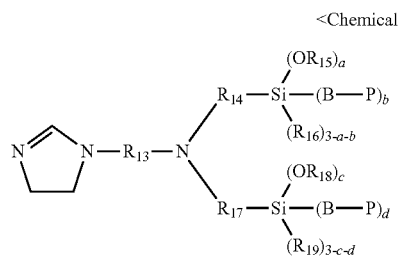

<Chemical Formula 3>

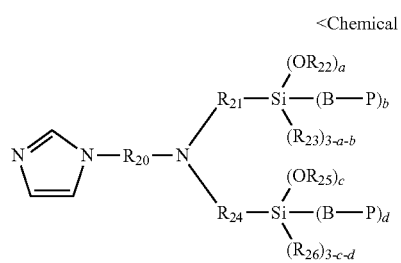

in Chemical Formulas 2 and 3, $R_{15}$, $R_{16}$, $R_{18}$, $R_{19}$, $R_{22}$, $R_{23}$, $R_{25}$, and $R_{26}$ are each independently a C1-C5 alkyl group, $R_{13}$, $R_{14}$, $R_{17}$, $R_{20}$, $R_{21}$, and $R_{24}$ are each independently a C1-C5 alkylene group, P is a conjugated diene-based polymer chain, B is Chemical Formula 15 below, a and c are each independently 0, 1, or 2, b and d are each independently 1, 2, or 3, and a+b and c+d are each independently 1, 2, or 3:

<Chemical Formula 15>

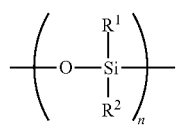

in Chemical Formula 15, n is an integer from 3 to 6, and $R^1$ and $R^2$ each are hydrogen, an alkyl group, an aryl group or a cycloalkyl group.

3. The modified conjugated diene-based polymer of claim 1, wherein Chemical Formula 1 is represented by Chemical Formula 4 or Chemical Formula 5 below:

<Chemical Formula 4>

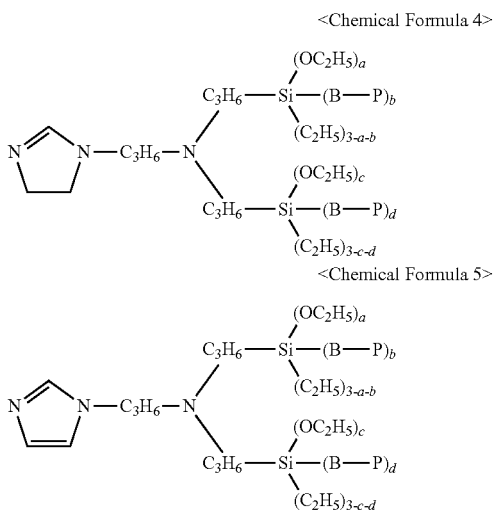

<Chemical Formula 5> in Chemical Formulas 4 and 5, P is a conjugated diene-based polymer chain, B is Chemical Formula 15 below, a and c are each independently 0, 1, or 2, b and d are each independently 1, 2, or 3, and a+b and c+d are each independently 1, 2, or 3:

<Chemical Formula 15>

in Chemical Formula 15, n is an integer from 3 to 6, and $R^1$ and $R^2$ each are hydrogen, an alkyl group, an aryl group or a cycloalkyl group.

4. The modified conjugated diene-based polymer of claim 1, wherein Chemical Formula 1 is represented by Chemical Formula 6 or Chemical Formula 7 below:

<Chemical Formula 6>

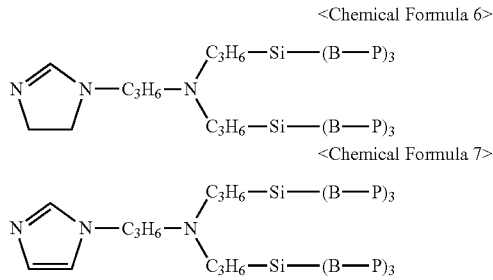

<Chemical Formula 7> in Chemical Formulas 6 and 7, P is a conjugated diene-based polymer chain, and B is Chemical Formula 15 below:

<Chemical Formula 15>

in Chemical Formula 15, n is an integer from 3 to 6, and $R^1$ and $R^2$ each are hydrogen, an alkyl group, an aryl group or a cycloalkyl group.

5. The modified conjugated diene-based polymer of claim 1, wherein Chemical Formula 15 is represented by Chemical Formula 16 below:

<Chemical Formula 16>

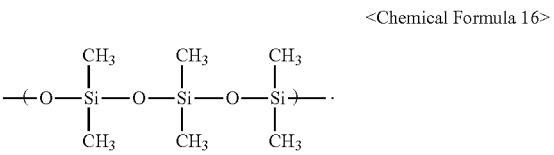

6. The modified conjugated diene-based polymer of claim 1, wherein the modified conjugated diene-based polymer has a number average molecular weight (Mn) of 1,000 to 2,000,000 g/mol.

7. The modified conjugated diene-based polymer of claim 1, wherein the modified conjugated diene-based polymer has a polydispersity index (Mw/Mn) of 0.5 to 10.

8. The modified conjugated diene-based polymer of claim 1, wherein the modified conjugated diene-based polymer has a polydispersity index (Mw/Mn) of 1 to 5.

9. The modified conjugated diene-based polymer of claim 1, wherein the modified conjugated diene-based polymer has a vinyl content of 5 wt % or more.

10. The modified conjugated diene-based polymer of claim 1, wherein the conjugated diene-based polymer chain is derived from a homopolymer of a conjugated diene monomer or a copolymer of a conjugated diene monomer and a vinyl aromatic monomer.

11. The modified conjugated diene-based polymer of claim 1, wherein the modified conjugated diene-based polymer includes 0.0001 to 50 parts by weight of an aromatic vinyl monomer based on 100 parts by weight in total of a conjugated diene monomer and the aromatic vinyl monomer.

12. The modified conjugated diene-based polymer of claim 1, wherein the modified conjugated diene-based polymer has a Mooney viscosity of 40 or more.

13. A method of preparing a modified conjugated diene-based polymer, comprising:
(a) polymerizing a conjugated diene monomer, or a conjugated diene monomer and a vinyl aromatic monomer with an organometallic compound using a solvent, thus forming an active polymer having a metal end;
(b) end-capping the active polymer having an alkali metal end with an end-capping agent represented by Chemical Formula 13 below; and
(c) modifying the active polymer with a compound represented by Chemical Formula 8 below:

<Chemical Formula 8>

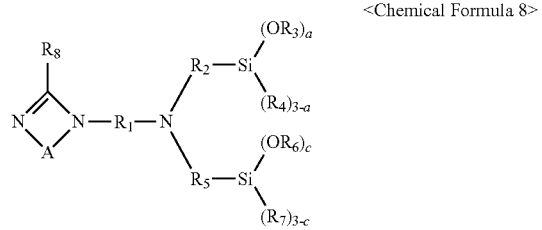

in Chemical Formula 8, $R_1$, $R_2$, and $R_5$ are each independently a C1-C10 alkylene group, $R_3$, $R_4$, $R_6$, and $R_7$ are each independently a C1-C10 alkyl group, $R_8$ is hydrogen or a C1-C10 alkyl group, a and c are each independently 0, 1, 2, or 3, and A is

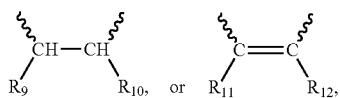

wherein $R_9$, $R_{10}$, $R_{11}$, and $R_{12}$ are each independently hydrogen or a C1-C10 alkyl group, and <Chemical Formula 13>

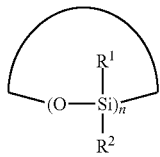

in Chemical Formula 13, n is an integer from 3 to 6, and $R^1$ and $R^2$ each are hydrogen, an alkyl group, an aryl group or a cycloalkyl group.

14. The method of claim 13, wherein the organometallic compound is used in an amount of 0.01 to 10 mmol based on 100 g in total of the monomer.

15. The method of claim 13, wherein a molar ratio of the organometallic compound and the compound represented by Chemical Formula 8 is 1:0.1 to 1:10.

16. The method of claim 13, wherein the polymerizing in (a) is performed with additional use of a polar additive.

17. The method of claim 16, wherein the polar additive is added in an amount of 0.001 to 10 g based on 1 mmol in total of the organometallic compound.

18. A modified conjugated diene-based polymer rubber composition, comprising 100 parts by weight of the modified conjugated diene-based polymer of claim 1, and 0.1 to 200 parts by weight of an inorganic filler.

19. The modified conjugated diene-based polymer rubber composition of claim 18, wherein the inorganic filler comprises at least one selected from the group consisting of a silica-based filler, carbon black, and mixtures thereof.

20. A tire or tire tread, comprising the modified conjugated diene-based polymer rubber composition of claim 18.

21. The method of claim 13, wherein the end-capping agent of Chemical Formula 13 is represented by Chemical Formula 14 below:

<Chemical Formula 14>

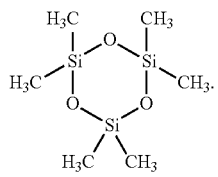

22. The method of claim 13, wherein Chemical Formula 8 is represented by Chemical Formula 9 or Chemical Formula 10 below:

<Chemical Formula 9>

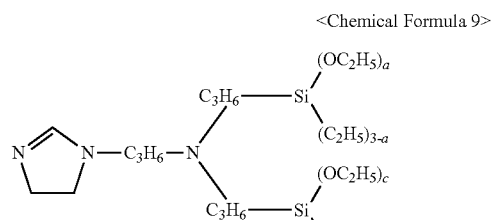

<Chemical Formula 10>

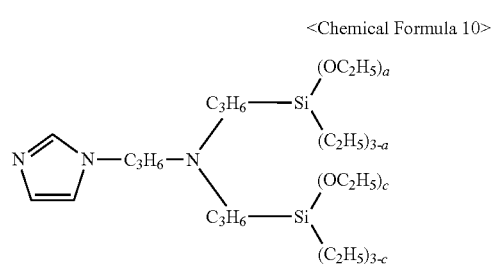

in Chemical Formulas 9 and 10, a and c are each independently 0, 1, 2, or 3.

23. The method of claim 13, wherein Chemical Formula 8 is represented by Chemical Formula 11 or Chemical Formula 12 below:

<Chemical Formula 11>

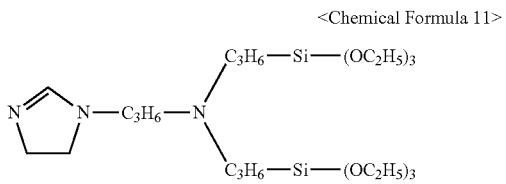

<Chemical Formula 12>

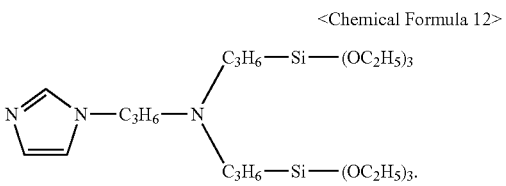

* * * * *